United States Patent [19]
Hoppl

[11] 3,868,171
[45] Feb. 25, 1975

[54] SURGICAL MICROSCOPE

[75] Inventor: Josef K. Hoppl, Bavaria, Germany

[73] Assignee: J. K. Hoppl Corporation, North Amityville, Long Island, N.Y.

[22] Filed: Mar. 9, 1973

[21] Appl. No.: 339,812

[52] U.S. Cl. .................................. 350/85, 350/91
[51] Int. Cl. ......................................... G02b 21/20
[58] Field of Search ................. 350/81, 82, 84, 85; 351/13

[56] References Cited
UNITED STATES PATENTS

| | | | |
|---|---|---|---|
| 2,326,552 | 8/1943 | Morse | 350/85 |
| 2,967,458 | 1/1961 | Stone, Jr. | 350/85 |
| 3,404,936 | 10/1968 | Bennett et al. | 351/13 X |
| 3,475,075 | 10/1969 | Stone, Jr. | 350/85 |

Primary Examiner—Ronald L. Wibert
Assistant Examiner—Matthew W. Koren
Attorney, Agent, or Firm—Lawrence S. Levinson; Merle J. Smith; John J. Archer

[57] ABSTRACT

A surgical microscope includes a mount which tiltably connects the objective and eyepiece lens package to the microscope's cantilever arm. The mount permits the objective lens to be moved through a specified arc, at all times maintaining a fixed distance from the focused field of view, thus permitting viewing the operative field through an angular range without the necessity for refocusing. A track member is rotatably connected to the cantilever arm and includes provision to accommodate a follower, at the lower end of which the lens systems are suitably connected. A motor is mounted in the follower and includes a gear which is received in a slot in the track member and which gear meshes with an arcuate shaped rack. The motor drives the gear, which in turn, drives the follower along the track member. The motor is controlled by means of a foot pedal.

11 Claims, 5 Drawing Figures

3,868,171

SURGICAL MICROSCOPE

BACKGROUND OF THE INVENTION

The present invention relates to an operating microscope, specifically a scope which permits viewing of a focused operative field through a given angular range, without the necessity for refocusing the objective lens.

Many surgical techniques have come to rely on the services of a high performance, multiple feature microscope to facilitate surgery on very small and delicate areas. Eye surgery is a striking example of an area where little meaningful surgery can be accomplished without the use of a microscope which provides an acceptably enlarged view of the eye, and at the same time permits the surgeon to effectively manipulate his instruments under an objective lens. An example of specific operations would be corneal transplants, cataract removal, and retinal repair. These operations are by no means exclusive applications of operating microscopes, nor are they limited to use on the eye. They have many other applications and have been often redesigned to accommodate a particular use.

Most microscopes, of the type adapted for surgical procedures, have at least some common components. Almost all are structurally supported by an upstanding base, although some recent developments include support from a base suspended from a ceiling. Most scopes also include a cantilever arm or an equivalent type structural arrangement to support the optical systems of the microscope off-center from the base. Assembled to the cantilever arm, in one way or another, is at least one objective lens system and one eyepiece lens system, both of which are sometimes combined into a single optical package. A light source, generally of the high intensity type, is needed to direct a powerful beam of light onto the operative field. The required movement of the various components, such as moving the lens package from one position to another, moving the light source and even focusing the objective lens, may be automated by providing the necessary activation structure within the base of the scope which is controlled by a foot pedal.

As surgical techniques become more complex, more features are added on to the scope increasing their utilization for particular operations. However, a specific feature that none of the prior art microscopes include is the ability to pivot the optical package through a given range, at the same time maintaining a fixed distance from the operative field, so that the operative field can be viewed from various orientations without refocusing the objective lens. The present invention provides a significant advance in that the movement of the lens package has been automated and may be controlled by a foot pedal so as to free the surgeon's hands at all times. The present invention, therefor, is directed to apparatus which provides the surgeon with maximum visibility of the operative field with a minimum of attendant manual manipulations.

SUMMARY OF THE INVENTION

A surgical microscope includes an upstanding base on which is mounted a cantilever arm. The cantilever arm is permitted to rotate about the base and serves to suspend the optical systems of the scope off-center from the base.

The optical systems of the scope include objective and eyepiece lens systems which may be combined into a single optical package. At least one high intensity light source is included to direct a powerful beam onto the operative field.

The novel structure incorporated in the instant invention permits the objective lens system to be moved through a given arcuate range; at all times the focus of the operative field being maintained. This feature permits the surgeon to view the surgical field at various orientations without the need for disturbing the focus of the objective lens. To this end, a track member is connected to the cantilever arm. A follower includes bearings which are received in slots in the track member. Since the track member is arcuate, the motion follower is circular, the center of motion being generally the focal point of the objective lens. The follower includes a motor to which is operatively connected a gear which extends therefrom into a longitudinal chamber in the track member. The gear mates with an arcuate rack which is affixed to a wall of the chamber, and as the motor rotates the gear, it and the follower, and consequently, the lens package is driven through the given arcuate range. In this manner the surgeon is able to view the surgical field from orientations within this arcuate range without having to refocus the objective lens. The motor may be controlled by a foot pedal, thereby freeing the surgeon's hands for other tasks.

The above and other aspects of the present invention will be apparent as the description continues, and when read in conjunction with the appended drawings.

DETAILED DESCRIPTION

Figure 1:
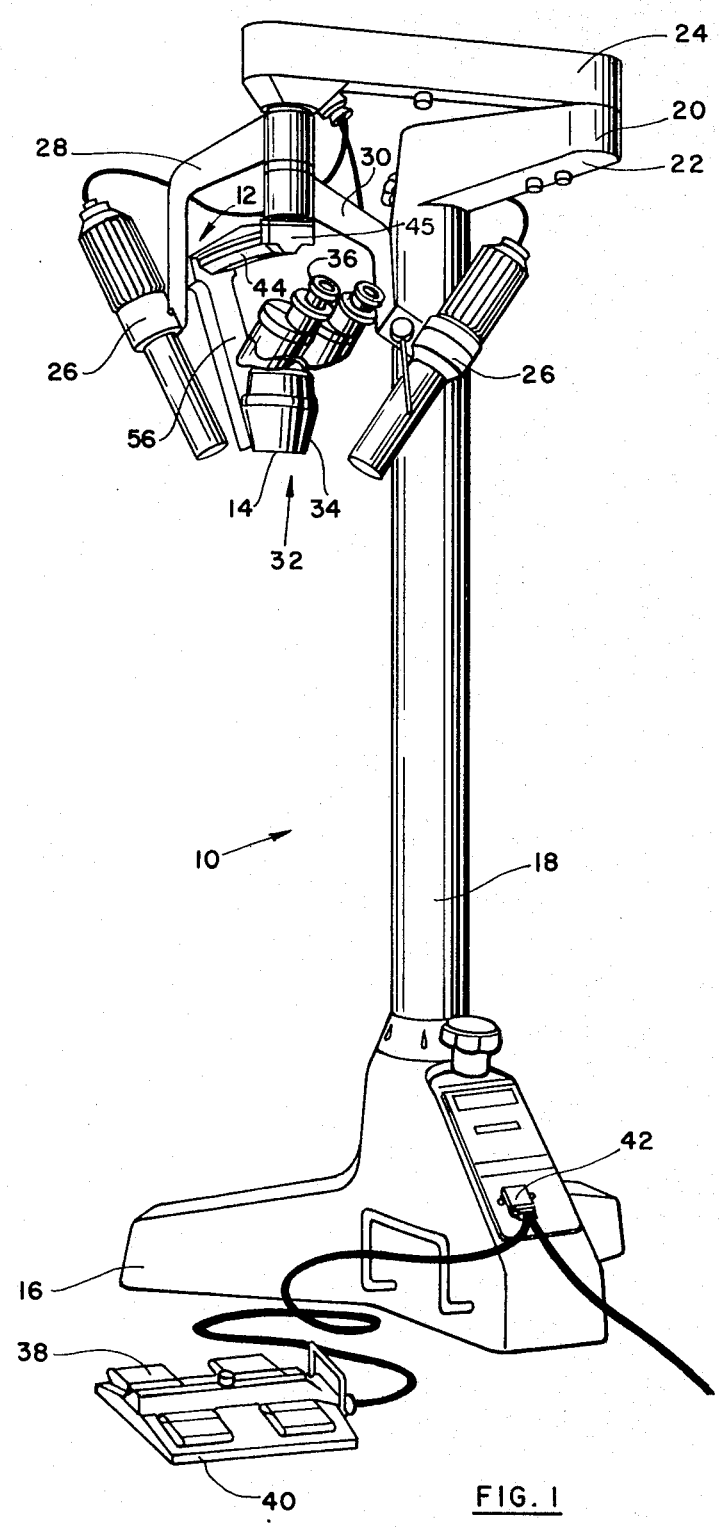
FIG. 1, is a perspective view of the complete surgical microscope incorporating the tiltable mount.

Referring to FIG. 1, a sample surgical microscope 10 is illustrated which incorporates the tiltable mount 12 which mount permits viewing the operative field from various perspectives without the need for refocusing the objective lens 14. The microscope 10 generally comprises the base 16 which supports the generally upstanding column 18. It should be noted that the present invention is applicable to microscopes which might be ceiling mounted. At the uppermost end of the column 18 is a cantilever arm 20 which is separated into a fixed section 22 and a movable section 24 which is permitted to pivot about the outermost end of the fixed section 22. The cantilever arm 20 thus serves to suspend the optical systems of the microscope off-center from the column 18.

The optical systems of the microscope are shown suspended downwardly from the movable section 24 and are journaled onto a shaft (not shown) which is suitably connected to that movable section. This arrangement permits the various optical systems to be rotated about that shaft for accurate placement within a surgical area. In the microscope shown, there are two light sources 26 of the high intensity type, which serve to direct concentrated beams of light onto the operative field. The light sources 26 are connected to the shaft by means of the elbow-shaped arms 28, 30 and can be swiveled to any desired position. The lens systems of this microscope are all arranged in a package 32 which is connected to the tiltable mount 12. The lens package basically comprises an objective lens system 14 housed in casing 34 and an eyepiece lens system 36 housed in the upper portion of casing 34. The present invention is not limited by the specific features incorporated by any particular lens package 32. Lens systems of many designs and capabilities may be associated with the tiltable mount 12.

A microscope of the type shown herein may have many manipulations controlled by foot pedals 38 mounted on a foot console 40 and which are suitably wired into the microscope by means of the jack 42. The electronics of the microscope are contained within the base 16 and column 18 and form no operative part of the instant invention. Various adjusting knobs and other features of the microscope are illustrated only for completeness but need not be discussed in detail since they do not relate to the features of the tiltable mount 12.

Figure 2:
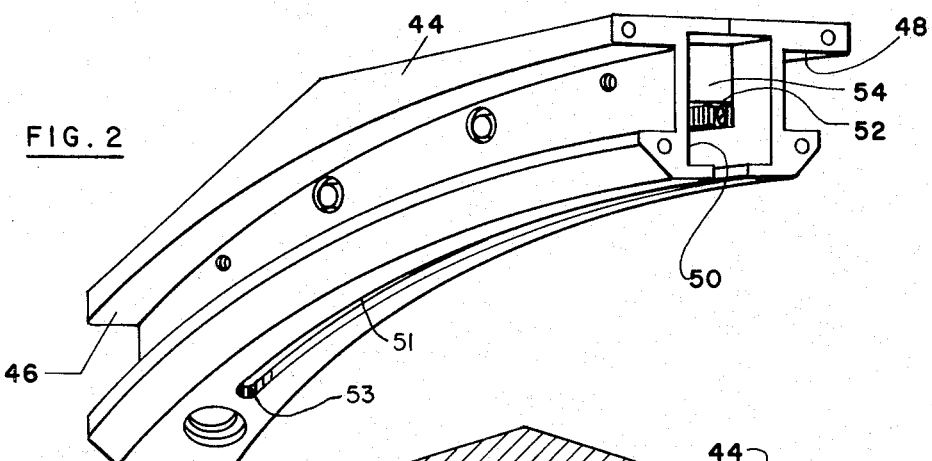
FIG. 2, is a perspective view of the track member.
Figure 3:
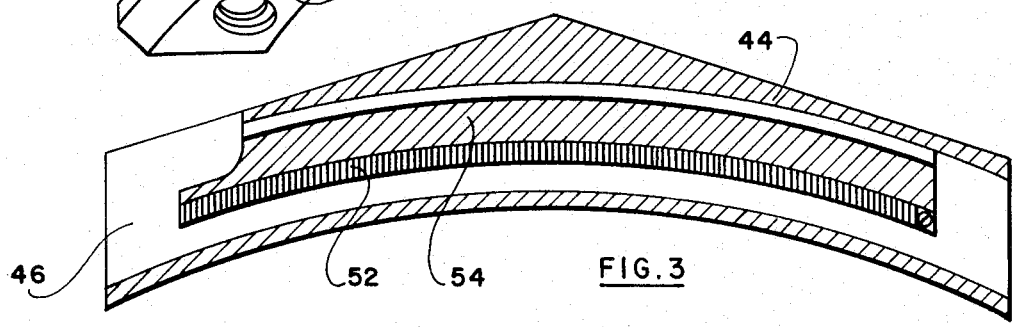
FIG. 3, is a side view of the track member partially cut-away to reveal the position of the rack.
Figure 5:
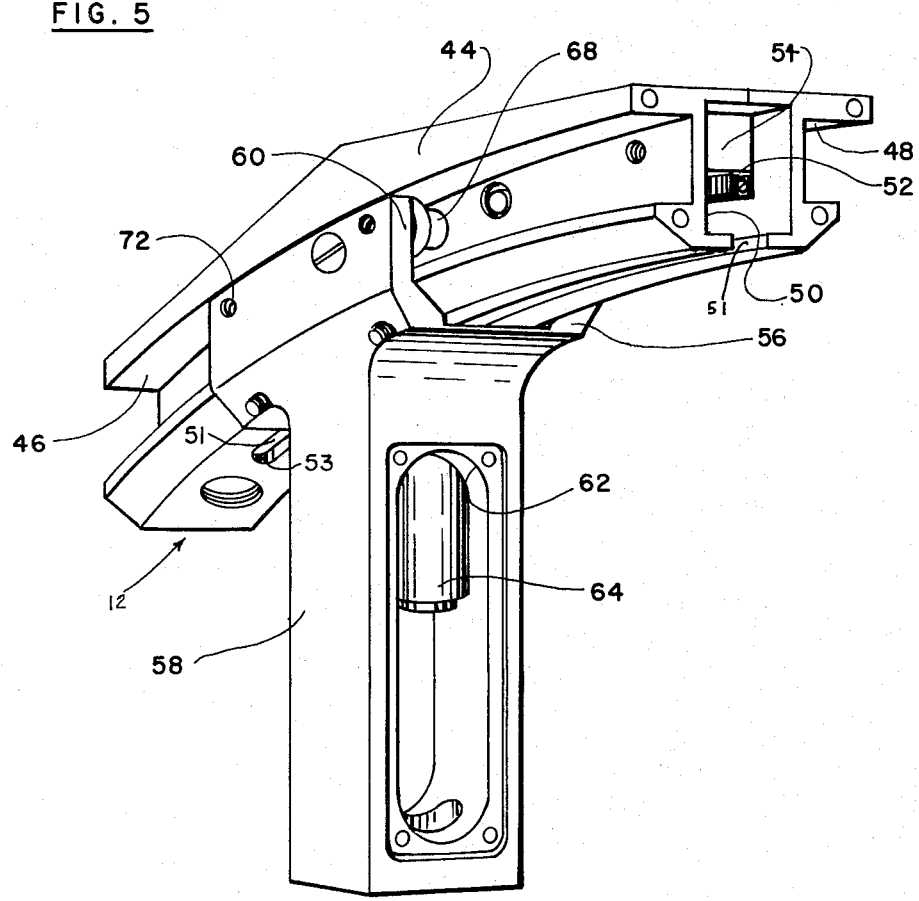
FIG. 5, is a perspective view of the track member and follower shown assembled.

The microscope 10 is provided with a tiltable mount 12 to permit the objective lens 14 to be moved through a given range without the necessity of having to refocus that lens once a particular operative field is brought into focus. The specifics of the tiltable mount 12 are illustrated in FIGS. 2 and 5. Rotatably connected to the shaft (not shown) by means of member 45 is a slotted track member 44. The track member 44 is formed with a predetermined arc and comprises the side slots 46, 48, the central slot 50, and a bottom slot 51 which terminates at bottom slot end 53. Within the central slot 50 a rack 52 is assembled to the wall 54, which rack has the same arcuate shape as does the track 44 and extends substantially through the entire length thereof. The slots 46, 48 are outwardly open and extend entirely through the length of the track 44.

Figure 4:
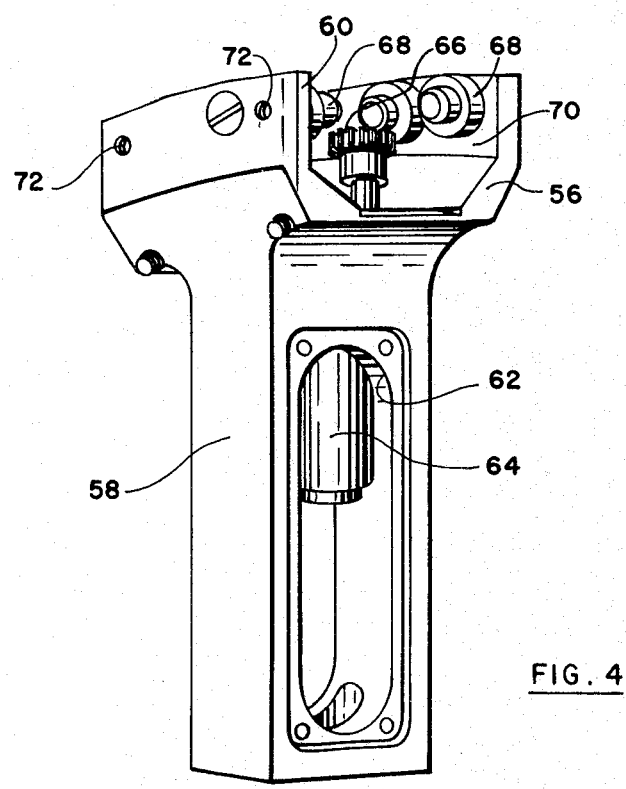
FIG. 4, is a perspective view of the follower.

As shown in FIG. 4, a follower 56 comprises the generally elongated stem 58 and an upper U-shaped portion 60 which is unitary therewith. The stem 58 includes a central chamber 62 which has a suitable motor 64 mounted therein. A gear 66 is operatively connected to the motor 64 and extends beyond the stem and into the confines of the U-shaped portion 60. A series of bearings 68 are connected at various positions along the interior walls of the U-shaped portion, which bearings are journaled onto shafts 72 which protrude from those walls.

In assembling the track 44 and follower 56 the bearings 68 are received within the side slots 46, 48, and the gear received in slots 50 and 51. The gear 66 and rack 52 are positioned such that upon assemblage of the track 44 and follower 56 they are mated. As the motor 64 drives the gear 66, that gear is driven along that rack. The gear 66, in turn, carries the entire follower along with it, and in accordance with the contours of the track 44 and rack 52, the motion of the follower is arcuate. The member 45 and the bottom slot end 53 provide stop means at their respective ends of the track 44 to limit the movement of the follower 56 along the track 44. Since the lens package 32 is connected to the lower end of the stem 58 that package moves with an arcuate motion identical to that of the follower 56. From FIG. 1 it is to be noted that the lens package is mounted off-center from the stem such that diameters of the circle of which the arc of the track member 44 forms a part, all pass through the objective lens. In this manner, the objective lens can be moved through the given arc without altering the distance between that lens and the focused operative field. In other words, the objective lens, once focused, will remain in focus throughout all positions which the track member 44 permits. In this manner, the surgeon may view a particular focused operative field through a variety of orientations without the bother of refocusing the objective lens system. Furthermore, the motor 64 may be controlled by means of a foot pedal 38 on the console 40 which completely frees his hands for any distracting manipulations. By means of this arrangement, the surgeon is now able to obtain a much more complete picture of the operative field, a feature which can be of great advantage in many delicate operations.

Many changes may be made in the details of the instant invention, in the method and materials of fabrication, in the configuration and assemblage of the constituent elements, without departing from the spirit and scope of the appended claims which changes are intended to be embraced therewithin.

What is claimed is:

1. In a surgical microscope of the type comprising a base member, a cantilever arm mounted on said base member, and objective and eyepiece lens means, a mount to tiltably connect said objective and eyepiece lens means to said cantilever arm which comprises, track means connected to said cantilever arm, follower means slidably received in said track means, said objective and eyepiece lens means connected to said follower means, and means to move said follower means with respect to said track means, said track means and said follower means cooperating such that a field of view of the objective lens means remains in focus throughout the entire range of movement of the follower means.

2. The microscope of claim 1 wherein said track means is arcuate, all circumferential points thereof being the same distance from the field of view, whereby as the follower means is moved relative to said track means, said field of view remains in focus permitting the viewing thereof through an angular range without refocusing the objective lens means.

3. The microscope of claim 2 wherein the follower means angularly depends from said track means generally radially with respect to the arc of said track means.

4. The microscope of claim 2 wherein said follower means comprises a beam slidably connected to said track means at one end and supporting said objective and eyepiece lens means at its other end, said objective and eyepiece lens means being movable through an arc corresponding to the arc of said track means and also rotatable about an axis perpendicular to the cantilever arm, whereby said objective and eyepiece lens means remain a generally fixed distance from the field of view during any combination of aforesaid movements.

5. In the microscope of claim 2 said means to move said follower means with respect to said track means includes motor means mounted in said follower means, a gear driven by said motor, said gear being received in a slot in said track means, a rack in said track means received in said slot and said gear being driven along said rack, said rack being arcuate and having the same general arc as that of said follower means.

6. The microscope according to claim 1 wherein said track means is rotatably connected to said cantilever arm.

7. The microscope recited in claim 1 wherein said track means is arcuate, all circumferential points thereof being the same distance from the field of view, said track means is rotatable about an axis perpendicular to the cantilever arm, whereby said follower means can be moved relative to said track means and said track means can be rotated about said axis, in any combination of the aforesaid movements, said field of view remaining in focus.

8. The microscope of claim 7 wherein the follower means angularly depends from said track means generally radially with respect to the arc of said track means.

9. The microscope recited in claim 1 wherein said follower means depends from said track means.

10. The microscope of claim 1 wherein said track means includes slotted slide rails, said follower means includes bearings rotatably journaled therein, and said bearings are received between said slide rails.

11. The microscope of claim 1 including stop means at the respective ends of said track means to limit the movement of said follower means therealong.

* * * * *